United States Patent [19]

Keady

[11] Patent Number: 4,564,500
[45] Date of Patent: Jan. 14, 1986

[54] OIL POT FOR REACTOR COOLANT PUMP MOTOR AND APPARATUS FOR CONTROLLING THE OIL LEVEL THEREIN

[75] Inventor: Richard J. Keady, Monroeville, Pa.

[73] Assignee: Westinghouse Electric Corp., Pittsburgh, Pa.

[21] Appl. No.: 545,420

[22] Filed: Oct. 25, 1983

[51] Int. Cl.[4] ............................................ G21C 9/00
[52] U.S. Cl. .................................. 376/463; 137/593; 184/103.1; 222/64
[58] Field of Search ............... 376/216, 247, 258, 463; 184/108, 6.1, 6.4, 6.21, 6.22, 96, 97, 103 R, 103 A, 104 R; 222/64, 67, 68, 69; 417/63; 73/291, 299, 326, 328; 374/141, 142, 143, 187, 197; 33/367; 137/265, 593

[56] References Cited

U.S. PATENT DOCUMENTS

| | | | |
|---|---|---|---|
| 1,153,546 | 9/1915 | Edwards | 184/96 |
| 1,736,671 | 11/1929 | Shaw | 184/103 R |
| 2,646,212 | 7/1953 | Kellie | 184/103 A |
| 3,080,309 | 3/1963 | Samuel | 376/216 |
| 3,447,562 | 6/1969 | Hoffman | 184/103 A |
| 3,487,467 | 12/1969 | Gruber | 184/6.4 |
| 3,491,939 | 1/1970 | Larsen et al. | 184/6.4 |
| 3,555,962 | 1/1971 | Wolf et al. | 184/104 R |
| 3,621,670 | 11/1971 | Kinney | 184/103 A |
| 3,852,661 | 12/1974 | Szabo et al. | 376/258 |
| 3,890,607 | 6/1975 | Pelenc et al. | 376/258 |
| 3,906,469 | 9/1975 | Kronk | 376/258 |
| 3,936,350 | 2/1976 | Borst | 376/258 |

OTHER PUBLICATIONS

"Mechanics, Heat, And Sound", by Francis Weston Sears, Addison-Wesley Publishing Co., Inc. 1950, pp. 317-318 and 370-372.

*Primary Examiner*—David H. Brown
*Assistant Examiner*—John E. Griffiths
*Attorney, Agent, or Firm*—L. A. DePaul

[57] ABSTRACT

A reactor coolant pump motor has an annular oil pot encircling the vertical motor shaft and containing lubricating oil to a predetermined normal level. A plurality of secondary oil containers are equidistantly spaced around the perimeter of the oil pot, each secondary container having a flat planar bottom surface disposed substantially at the normal oil level of the oil pot. A plurality of conduits provide liquid communication between the bottom of the oil pot and the bottoms of the secondary containers. Each secondary container is substantially closed, but vented to atmosphere.

3 Claims, 7 Drawing Figures

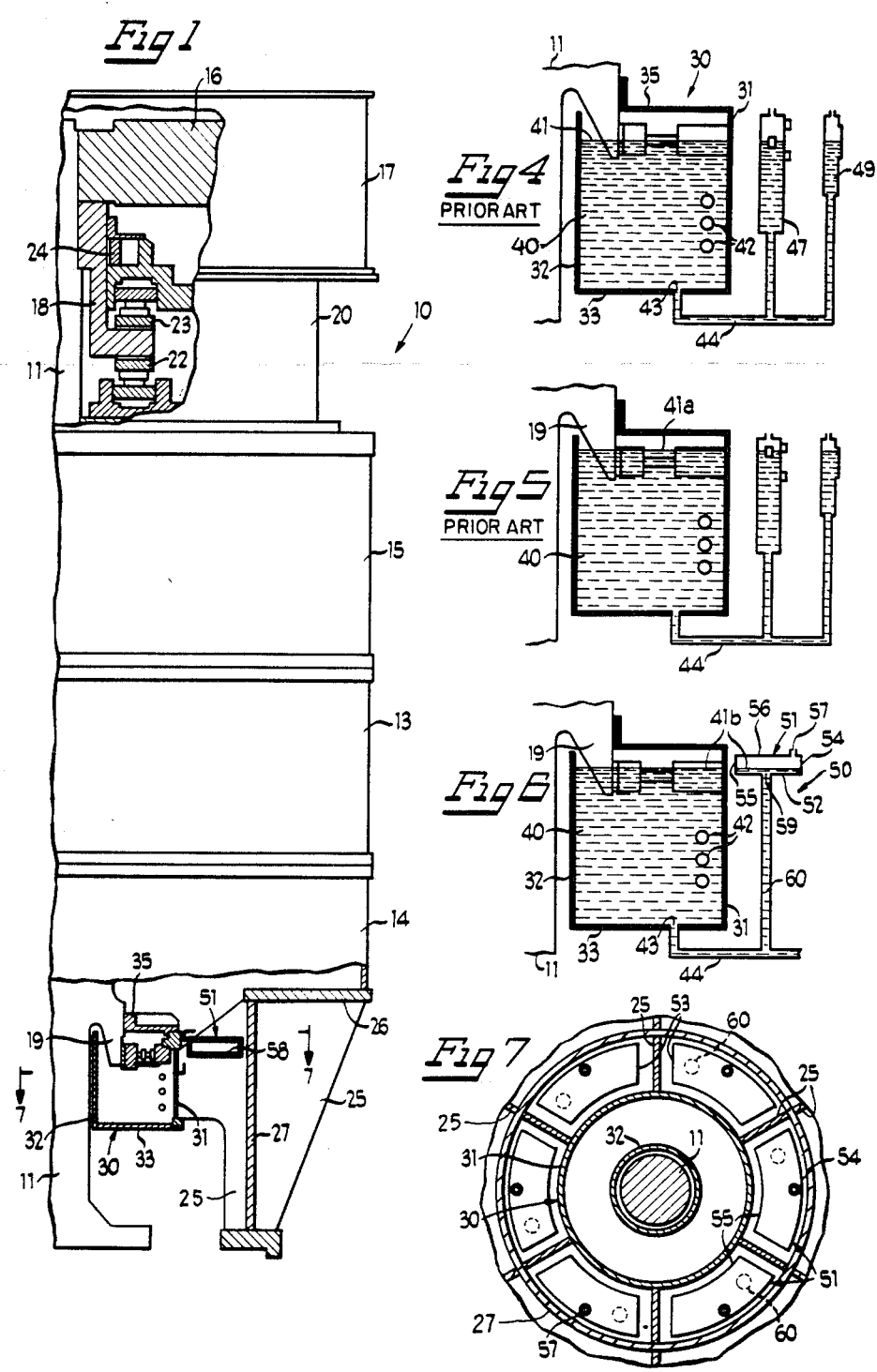

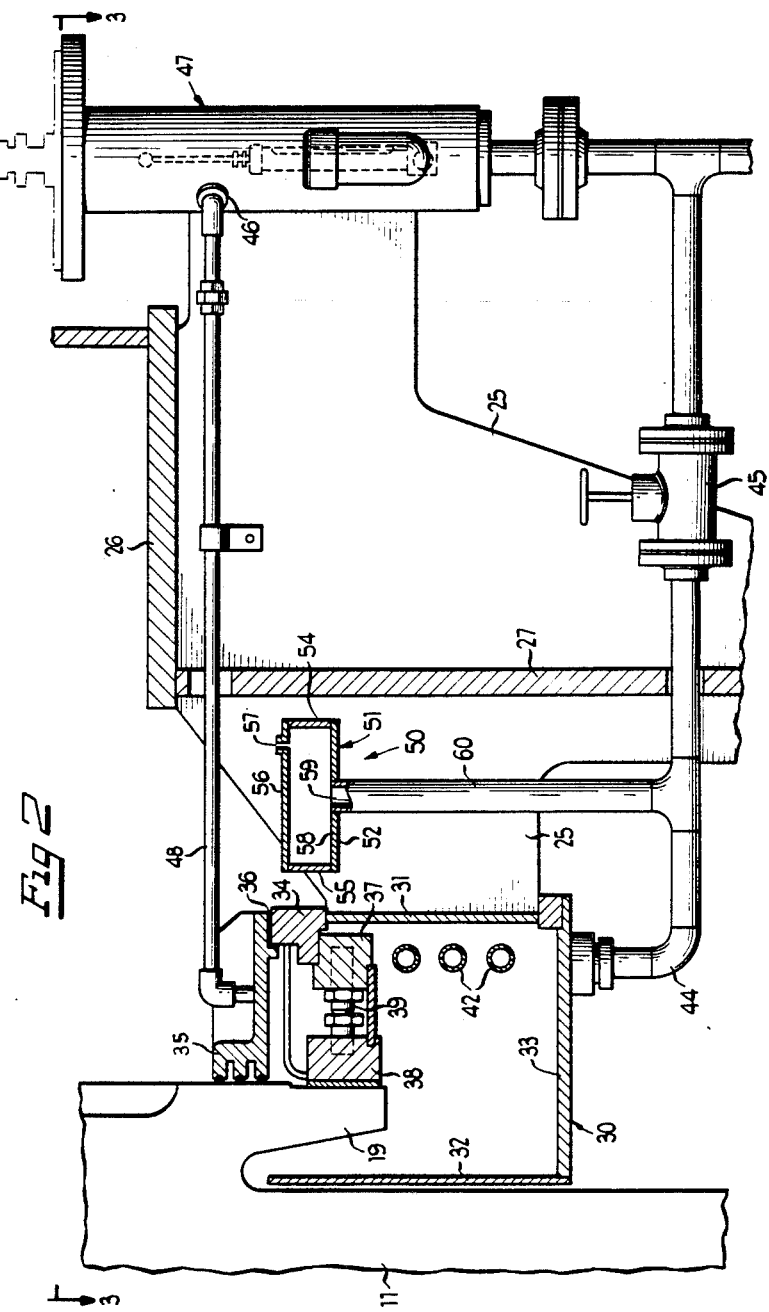

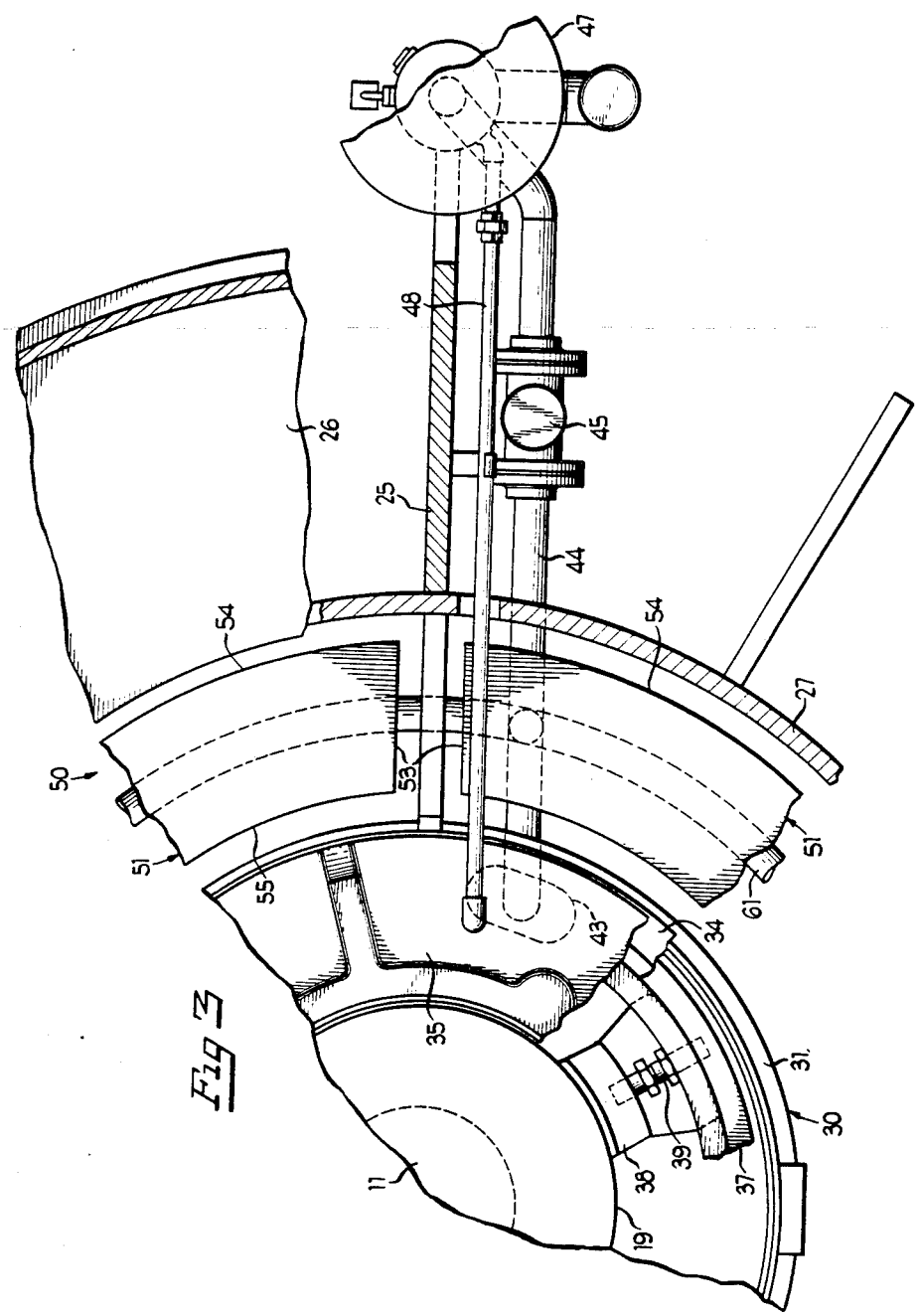

OIL POT FOR REACTOR COOLANT PUMP MOTOR AND APPARATUS FOR CONTROLLING THE OIL LEVEL THEREIN

BACKGROUND OF THE INVENTION

The present invention relates to apparatus for controlling the level of a liquid in a container.

In particular, the present invention relates to apparatus for controlling the level of lubricating oil in the oil pot of a motor, the invention having particular application to reactor coolant pump motors in nuclear power plants.

The reactor coolant pump motors drive the reactor coolant pumps which are part of the reactor coolant system in a nuclear power plant. The motors are typically arranged with vertical shafts. The bearing and lubrication system of a vertical motor is usually contained in two separate oil pots. An upper oil pot contains the upper guide or radial bearings and the total thrust bearing system. A lower oil pot contains the lower guide or radial bearings. Each of these oil pots is typically provided with cooling coils for carrying cooling water to dissipate the heat which is generated by the bearing systems.

The design of the oil pots is such that the oil level within the pot should be monitored during operation to ensure that the oil level is not rising above or falling below expected levels. A rising level might indicate, for example, a water leak within the cooling coils which results in water entering the pot and mixing with the oil. If such a situation were to persist, the lubricating ability of the oil would be sharply diminished and, more importantly, the oil/water mixture would overflow the pot and migrate toward the hot reactor coolant pump, where a fire would almost certainly result.

A falling level would be indicative of a leak in the oil pot system which allows oil to escape from the pot. If this situation persists, the level of the oil in the pot will drop below the level where the oil lubricates the bearings and thus result in severe damage to the bearings and possibly to the motor shaft/runner. More importantly, this condition could also result in a fire if the oil, with a flash point of 420° F. reaches the pump surfaces which may be as hot as 550° F.

Because of these very real and serious concerns, each of the two oil pots is equipped with an oil level detector which provides an alarm signal to a control room in the event of an unusual oil level condition. Some concern exists that the detector may generate a high level alarm when, in fact, the system is operating normally, i.e., there is no leakage of water into the oil pump. A major contributor to this potential problem, particularly with respect to the lower oil pot, is the expansion of the oil due to heat entering the oil pot from the reactor coolant pump. A temperature rise of 50° F. in the oil of the pot, for example, would result in a volume expansion of approximately 0.6 gallon in a 30-gallon capacity pot. This is reflected in the rise of the oil level within the pot and the detector of 0.5 in or more, and could result in a spurious high level alarm signal.

SUMMARY OF THE INVENTION

It is a general object of this invention to provide an improved oil pot arrangement for a vertical shaft pump motor which avoids the disadvantages of prior arrangements while affording additional structural and operating advantages.

An important object of this invention is the provision of oil level control apparatus for a pump motor oil pot which minimizes the effects of thermal expansion of the oil.

In connection with the foregoing object, it is another object of this invention to provide an oil level control apparatus which provides an increase in the effective surface area of the oil pot in response to an increase in the volume of the oil contained therein.

It is another object of this invention to provide an oil level control apparatus of the type set forth which minimizes the chance of spurious high level alarm signals.

In connection with the foregoing objects, it is another object of this invention to provide an oil level control apparatus of the type set forth, which is of simple and economical construction and contains no moving parts and consumes no power.

These and other objects of the invention are attained by providing apparatus for controlling the level of bearing lubricating oil in the oil pot of a nuclear reactor coolant pump motor which has a predetermined normal oil level, the apparatus comprising: container means having a surface area which is relatively large in comparison to its depth, the container means having a flat planar bottom surface disposed substantially at the normal oil level of the oil pot, and means providing liquid communication between the oil pot and the container means so as to equalize the oil levels therein, whereby an increase in the volume of the oil produces an increase in the oil level inversely proportional to the surface area of the oil in said container means.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary elevational view, in partial section, of a reactor coolant pump motor incorporating the oil level control apparatus of the present invention;

FIG. 2 is an enlarged fragmentary view in vertical section of the lower portion of the pump motor of FIG. 1, illustrating the present invention;

FIG. 3 is a fragmentary top plan view of the portion of the pump motor illustrated in FIG. 2, with portions broken away more clearly to show the structure of the present invention;

FIG. 4 is a diagrammatic view of the lower oil pot of a prior art reactor coolant pump motor, with the oil therein at a normal level;

FIG. 5 is a view similar to FIG. 4, illustrating the oil level after thermal expansion of the oil;

FIG. 6 is a view similar to FIG. 5, and illustrating the oil level after thermal expansion of the oil with the present invention; and FIG. 7 is a reduced fragmentary view in horizontal section, taken generally along the line 7—7 in FIG. 1, and illustrating the present invention around the entire circumference of the pump motor.

DESCRIPTION OF THE PREFERRED EMBODIMENT

Referring to FIGS. 1 and 7 of the drawings, there is illustrated a reactor coolant pump motor, generally designated by the numeral 10, which is of conventional construction. The motor 10 includes a vertical shaft 11 on which is mounted a rotor core assembly (not shown) surrounded by a stator core assembly 13 which is supported between lower and upper brackets 14 and 15. The upper end of the shaft 11 carries a flywheel 16 mounted within a flywheel cover 17. The shaft 11 is provided with upper and lower annular runners 18 and 19.

The upper runner 18 extends into an annular upper oil pot 20 encircling the shaft 11 and is disposed for engagement with an up-thrust bearing 22, and down-thrust bearing 23 and an upper guide bearing 24, all disposed within the upper oil pot 20. The lower runner 19 extends downwardly into an annular lower oil pot 30 which encircles the shaft 11 and is supported on a plurality of equiangularly spaced-apart lower support webs 25, the webs 25 being interconnected by an annular support plate 26 and by cylindrical connecting webs 27 (see FIG. 7).

Referring also to FIGS. 2 and 3 of the drawings, the lower oil pot 30 includes a cylindrical outer wall 31 and a cylindrical inner wall 32, the walls 31 and 32 being interconnected by an annular bottom wall 33. Fixedly secured to the outer wall 31 at the upper edge thereof is a circular head rail 34 which supports thereon an annular seal 35, a gasket 36 being provided therebetween (see FIG. 2). The seal 35 is disposed in sealing engagement with the runner 19 of the shaft 11. Carried by the head rail 34 within the oil pot 30 is a support ring 37. A plurality of bearing shoes 38 are disposed for bearing engagement with the outer surface of the runner 19 at equiangularly spaced-apart points therearound, the bearing shoes 38 being respectively held in engagement with the runner 19 by a plurality of adjusting screws 39 carried by the support ring 37.

All of the structure described above is of conventional construction and is provided in prior art reactor coolant pump motors. The lower oil pot for such a prior art motor is disclosed diagrammatically in FIGS. 4 and 5. The oil pot 30 contains a volume of oil 40 which, at ambient temperatures, normally fills the oil pot 30 to a level 41 illustrated in FIG. 4. A plurality of cooling coils 42 carry cooling water through the oil pot 30 for cooling the oil 40 therein. The oil pot 30 communicates at a port 43 in the bottom wall 33 with a conduit 44 which connects through a valve 45 (see FIGS. 2 and 3) to one or more oil level gauges, which may include a float guide 47 and a sight gauge 49 (see FIG. 4). Both of the gauges 47 and 49 are in liquid communication with the conduit 44 so that the oil rises therein to the same level 41 as is present in the oil pot 30. The float gauge 47 carries a floating element which is disposed for magnetically operating high and low sensor switches to indicate abnormally high or low levels of the oil 40 in the oil pot 30. The sight gauge 49 typically includes a transparent window portion so that the level of oil 40 therein can be visibly observed.

The high level indication is to indicate excess fluid in the oil pot 30 which might be occasioned by a water leak within the cooling coils 42, resulting in water entering the oil pot 30 and mixing with the oil 40. Such a high level would typically trigger an alarm signal, since the dilution of the oil 40 would lessen its lubricating ability and, more importantly, as the leak continued the oil/water mixture might overflow the oil pot 30 and contact the hot reactor coolant pump, causing a fire. The low level sensor is for the purpose of indicating a falling oil level in the oil pot 30, which might be indicative of an oil leak. Such a low level would trigger an alarm signal since a continued leak would cause the oil level to drop to the point where the oil no longer lubricates the bearing shoes 38, resulting in severe damage to the bearing shoes and, possibly to the motor shaft 11 and/or runner 19. Furthermore, this condition could also result in a fire if the leaking oil were to contact the hot pump surfaces.

In this prior art arrangement, the oil 40 in the oil pot 30 tends to expand when heated. Indeed, despite the cooling effect of the cooling coils 42, the oil 40 may be heated to such an extent that it expands to a level 41a illustrated in FIG. 5, such that it will actuate the high level sensor in the float gauge 47 setting off a high level alarm. Such an alarm is spurious since it is not occasioned by excess fluid in the oil pot 30.

The present invention is designed to prevent such spurious high level signals. Thus, referring also to FIG. 6 of the drawings, the present invention includes a level control assembly, generally designated by the numeral 50, which comprises a plurality of secondary containers 51 equiangularly spaced apart around the outside of the lower oil pot 30, as is best illustrated in FIGS. 3 and 7. The secondary containers 51 are substantially identically constructed, each including a flat bottom wall 52, a pair of upstanding rectangular end walls 53, part-cylindrical outer and inner side walls 54 and 55 and a flat top wall 56 cooperating to define a substantially closed shallow container, the horizontal dimensions of which are substantially greater than its depth. A vent opening 57 is provided in the top wall 56. Each of the secondary containers 51 is arranged so that the inner surfaces 58 of the bottom walls 52 are disposed substantially horizontally and coplanar with the normal level 41 of the oil 40 in the oil pot 30. The bottom walls 52 are respectively provided with ports 59 which are in fluid communication, respectively through conduits 60, with a connecting conduit 61 (see FIG. 3), which is in turn in fluid communication with the conduit 44. Thus, the oil level in the conduits 60 and the secondary containers 51 is the same as in the lower oil pot 30.

Preferably, the secondary containers 51 are disposed in the annular space between the outer wall 31 of the lower oil pot 30 and the connecting webs 27, and respectively between adjacent ones of the lower support webs 25. The secondary containers 51 are dimensioned so as not to completely close the space between the oil pot 30 and the connecting webs 27, thereby to permit free flow of air therethrough. However, the secondary containers 51 are dimensioned so that the bottom walls 52 thereof cooperate to provide a combined surface area approximately equal to the surface area of the lower oil pot 30.

Thus, it will be appreciated that the level control assembly 50 operates substantially to increase the effective surface area of the lower oil pot 30. Accordingly, when the oil 40 undergoes thermal expansion, the oil level will increase only to a level 41b illustrated in FIG. 6, substantially lower than the level 41a in the prior art apparatus (FIG. 5), because the expanding oil must cover a substantially increased surface area provided by the secondary containers 51. Thus, it will be appreciated that with the present invention the increase in oil level as a result of a given amount of thermal expansion will be inversely proportional to the surface area of the oil in the secondary containers 51. This effectively prevents spurious high level alarm signals as a result of thermal expansion of the oil 40.

While the level control assembly 50 has been disclosed as containing six of the secondary containers 51, it will be appreciated that any desired number could be provided and, similarly, each of the secondary containers 51 could have any desired shape and size, it being necessary only that the secondary containers 51 be in liquid communication with the oil pot 30 so that the oil level is the same in both.

From the foregoing, it can be seen that there has been provided an improved apparatus for controlling the oil level in the lower oil pot of a reactor coolant pump motor, which apparatus is of simple and economical construction, having no moving parts and consuming no power. This apparatus effectively prevents spurious high oil level alarm signals in the lower oil pot of a reactor coolant pump motor.

I claim:

1. Apparatus for controlling the level of bearing lubricating oil in an oil pot of a nuclear reactor coolant pump motor with the oil pot having a substantially flat bottom and a predetermined normal oil level, said apparatus comprising: a plurality of containers, substantially equidistantly spaced apart around the perimeter of the oil pot with at least one said containers being substantially closed and vented and with each of said containers having a surface area which is relatively large in comparison to its depth, each of said containers having a flat planar bottom surface disposed substantially at the normal oil level of the oil pot, and an unobstructed fluid conduit connected between the bottom of the oil pot and the bottom surface of each of said containers for providing liquid communication between the oil pot and each of said containers so as to equalize the oil levels therein, whereby an increase in the volume of the oil produces an increase in the oil level in said containers inversely proportional to the surface area of the oil in containers.

2. Apparatus for controlling the level of bearing lubricating oil in a nuclear reactor coolant pump motor, said apparatus comprising: a primary oil container having a substantially flat bottom and having a predetermined normal level of oil contained therein, a plurality of secondary containers substantially equidistantly spaced apart around the perimeter of said primary container with at least one of said secondary containers being substantially closed and vented and with each of said secondary containers being in liquid communication with said primary container and having a surface area which is relatively large in comparison to its depth, each of said secondary containers being substantially the same size and shape and each having a substantially flat planar bottom surface disposed substantially at the normal level of oil in said primary container, and an unobstructed fluid conduit extending from the bottom of said primary container to the bottom of at least one of said secondary containers providing liquid communication between said primary container and said secondary containers for equalizing the oil levels therein, whereby an increase in the volume of oil in said primary container produces an increase in the oil level in said secondary containers which is inversely proportional to the surface area of the oil in said secondary containers.

3. Apparatus for controlling the level of bearing lubricating oil in a nuclear reactor coolant pump motor having a vertical shaft, said apparatus comprising: an annular primary oil container encircling the motor shaft and having a predetermined normal level of oil contained therein, a plurality of secondary containers each having an arcuate inner side wall arranged concentrically with respect to said primary container and spaced apart circumferentially of said primary container with each being in liquid communication with said primary container and disposed radially outwardly of said primary container, said secondary containers having a surface area which is relatively large in comparison to its depth, said secondary containers having a flat planar bottom surface disposed substantially at normal level of the oil in said primary container, and means for providing liquid communication between said primary container and said secondary containers for equalizing the oil levels therein, whereby an a change in the volume of oil in said primary container produces a change in the oil level in said secondary containers which is inversely proportional to the surface area of the oil in said secondary containers.

* * * * *